March 9, 1943. G. T. DOWNEY 2,313,631
BALANCED VALVE ASSEMBLY
Filed Feb. 9, 1942 3 Sheets-Sheet 1
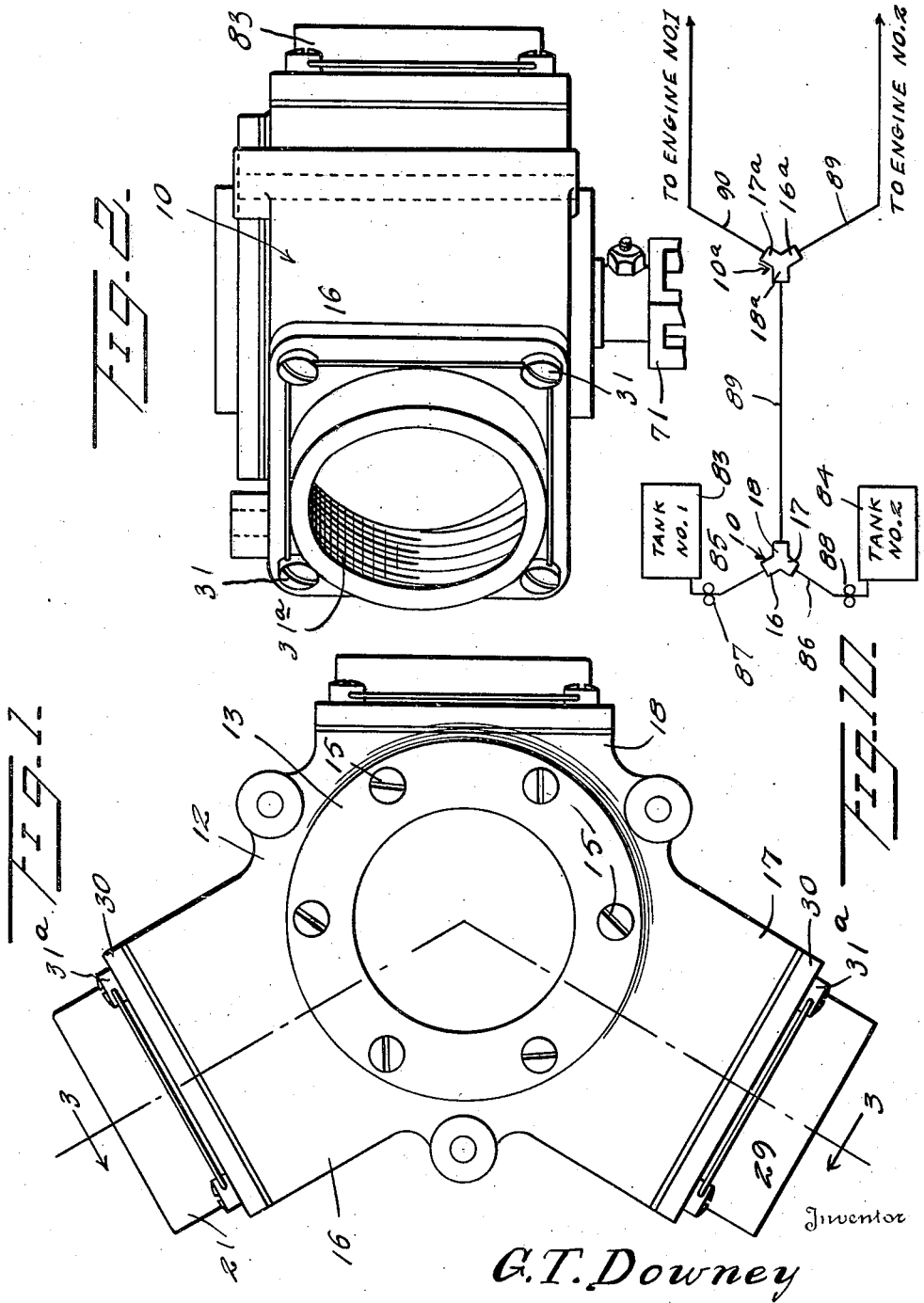
Inventor
G. T. Downey
By Kimmel & Crowell
Attorneys

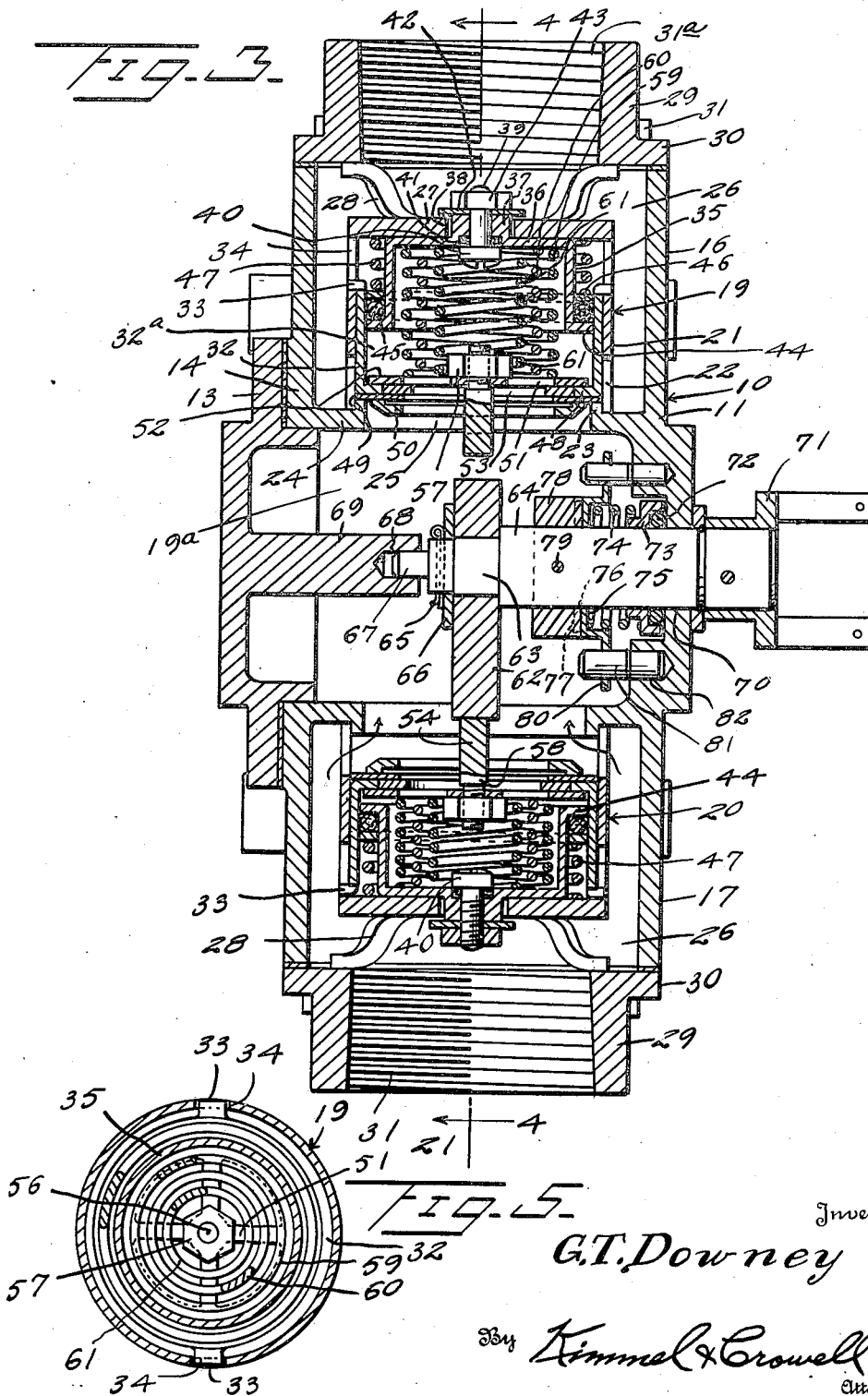

March 9, 1943. G. T. DOWNEY 2,313,631
BALANCED VALVE ASSEMBLY
Filed Feb. 9, 1942 3 Sheets-Sheet 3
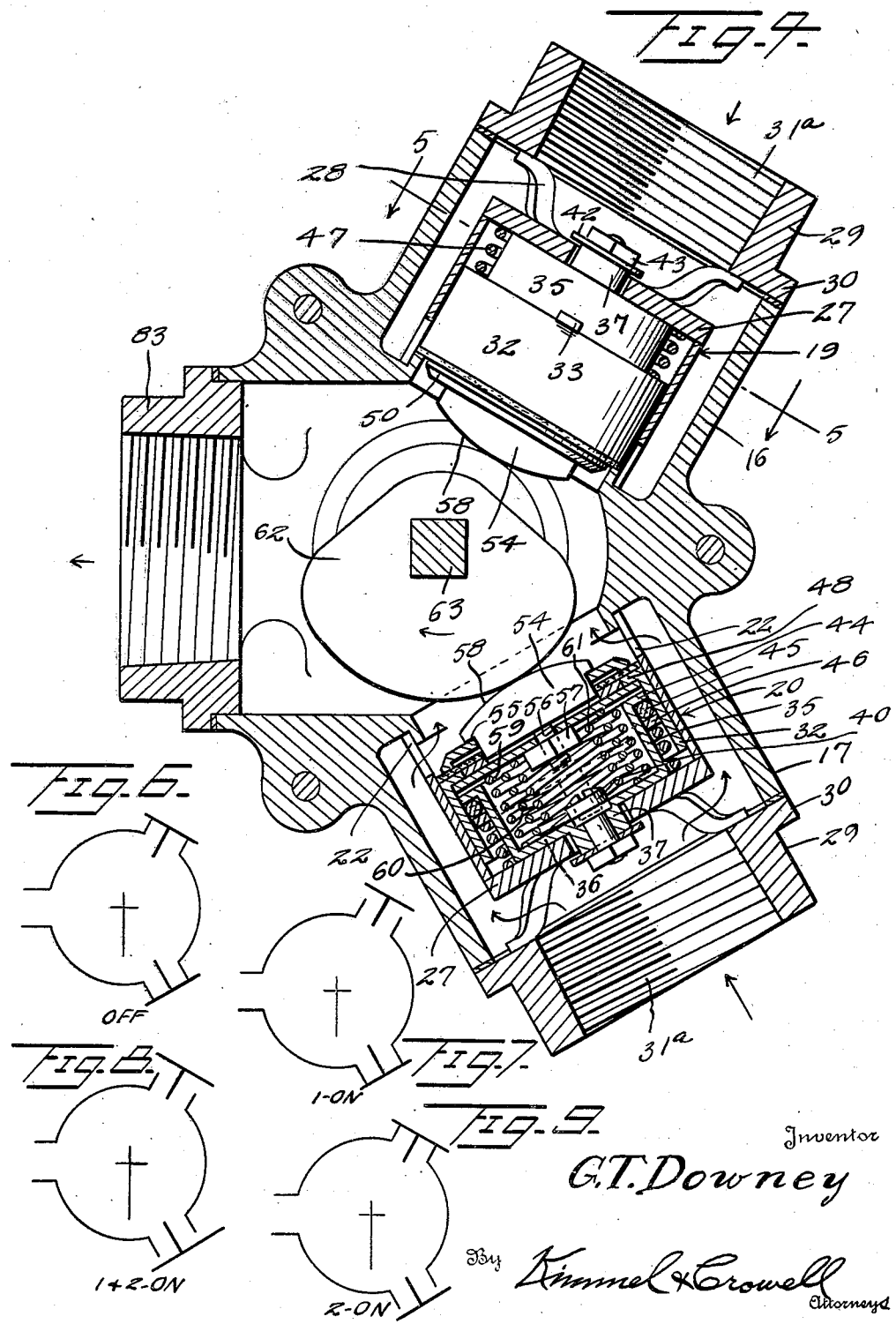

Patented Mar. 9, 1943

2,313,631

UNITED STATES PATENT OFFICE 2,313,631

BALANCED VALVE ASSEMBLY

George T. Downey, Corry, Pa., assignor to Aero Supply Mfg. Co. Inc., Corry, Pa.

Application February 9, 1942, Serial No. 430,143

8 Claims. (Cl. 251—132)

This invention relates to balanced valve structures of the multiple type.

An object of this invention is to provide a valve structure for connection to a plurality of fluid sources, and to a suction pump or pressure pump which is so constructed as to provide for a balancing of pressure on opposite sides of each valve.

Another object of this invention is to provide an improved valve assembly including telescopically arranged valve cages for mounting in a valve housing whereby the pressures on opposite sides of the housing will be equalized, so as to thereby provide for more positive operation of the valve and prevent accidental movement of a valve to open position under back pressure.

A further object of this invention is to provide an improved valve assembly which may be constructed as a unit for mounting in a valve housing, so that the assembly may be constructed as a line production unit and may be easily and quickly inserted or replaced in the valve housing.

A further object of this invention is to provide an improved valve assembly which includes the use of a plurality of concentric springs for urging the valve member to closed position, so as to thereby eliminate the possibility of the valve not closing because of breakage of one or more springs.

To the foregoing objects and others which may hereinafter appear, the invention consists of the novel construction, combination and arrangement of parts as will be more specifically referred to and illustrated in the accompanying drawings, but it is to be understood that changes, variations and modifications may be resorted to which fall within the scope of the invention as claimed.

In the drawings:

Figure 1 is a detail end elevation of a valve assembly constructed according to an embodiment of this invention, Figure 2 is a detail side elevation of the device, Figure 3 is a sectional view taken on the line 3—3 of Figure 1, Figure 4 is a sectional view taken on the line 4—4 of Figure 3, Figure 5 is a sectional view taken on the line 5—5 of Figure 4, Figure 6 is a diagrammatic view of the valve structure with the valves in closed position, Figure 7 is a diagrammatic view showing one of the valves in open position, Figure 8 is a diagrammatic view showing both of the valves in open position, Figure 9 is a diagrammatic view showing another one of the valves in open position, and Figure 10 is a diagrammatic view of a fuel system in which a pair of these valves are interposed.

Referring to the drawings the numeral 10 designates generally a valve housing which is formed of a central housing body including an end wall 11, a side wall 12, and a removable plate 13 which is disposed opposite from the end wall 11, the plate 13 being secured to a wall 14 by fastening devices 15. The housing 10 also includes a pair of valve housings 16 and 17 which are of like construction and are disposed radially with respect to the axial center of the housing 10. The housing 10 also includes an outlet boss or housing 18 communicating with the central chamber 19a formed between the inner ends of the two housings 16 and 17.

The valve housings 16 and 17 constitute fluid intake or outlet housings, and are adapted to be connected to independent sources of fluid supply, such as gasoline or the like, the fluid sources being gasoline tanks positioned within an airplane.

A valve assembly generally designated as 19 is disposed within the housing 16, and a valve assembly 20 is disposed within the housing 17. The two valve assemblies 19 and 20 are of like construction, and the details of construction of one of these assemblies will apply equally as well to the details of construction of the other assembly. The valve assembly 19 comprises an outer cylindrical body or cage 21 which is provided with a pair of diametrically opposed fluid intake ports 22. The cage 21 is adapted to engage about an annular rib 23 which is formed on the outer side of an inner end wall 24 formed between the inner end of the housing 16 and the chamber 19a.

The outer side of the rib 23 constitutes a valve seat, and the interior of the rib 23 constitutes a fluid inlet port 25 communicating the intake chamber 26 of the housing 16 with the chamber 19a. A plate or head 27 engages against the outer end of the cage 21, and is held tightly against the cage 21 by means of a plurality of resiliently and longitudinally bowed cage clamping fingers 28 which are welded or otherwise secured to the outer side of the head 27. The outer or divergent ends of the spring fingers 28 engage against the inner end of a coupling member 29 formed with a flange 30, which is secured by fastening devices 31 to the outer end of the valve housing 16. The coupling member 29 is formed with interior threads 31a for connection with a fluid conduit which may be connected at the opposite end thereof with a fluid holding tank.

An inner cylindrical valve body 32 is slidably disposed within the cage 21 and is formed at its outer end with a pair of outwardly projecting lugs 33 which extend outwardly through opposed elongated slots or openings 34 which are formed in the cage 21. The lugs 33 hold the inner cylindrical valve body 32 against rotary movement with respect to the cage 21 while permitting endwise movement of the valve body 32. A second inner cylindrical body 35 is disposed interiorly of the cage 21 and is formed at its outer end with an outer end wall 36 engageable against the inner side of the head 27. An annular boss 37 is formed in the center of the wall 36 and extends outwardly through an opening 38 which is formed in the center of the head 27.

The wall 36 is movably secured with respect to the head 27 by means of a bolt 39 which is extended through the boss 37 and has the head 40 thereof countersunk in an opening or recess 41 which is formed in the wall 36. A washer 42 is interposed between the clamping nut 43 and the outer side of the head 27, and is normally disposed in outwardly spaced relation with respect to the outer side of the head 27.

The cylindrical body 35 at its inner end is formed with an annular flange 44 which is slidably engaged within the interior of the intermediate or slidable valve body 32. In order to provide a means whereby the inner cylindrical body 35 with the flange 44 may be sealed with respect to the valve body 32, an annular rubber or sealing member 45 is disposed between the inner side of the cylindrical valve body 32 and the outer side of the cylindrical body 35 and engages on the outer side of the flange 44. A ring or annulus 46 is disposed in the space between the two cylindrical members 32 and 35 and engages against the outer side of the sealing member 45. A compression spring 47 bears at one end against the annulus 46 and at the other end against the head 27, so as to constantly maintain the sealing member 45 in a sealing position.

The cylindrical valve body 32 at its inner end is formed with an annular inwardly projecting flange 48 against which the outer side of a valve gasket 49 is adapted to engage. The gasket 49 is held tightly against the flange 48 by means of an annular pressure member 50 which has a diameter slightly less than the inner diameter of the rib 23. A spider 51 including an annular outer rim 52 engages against the outer side of the flange 48, and an annular member 53 is interposed between the inwardly projecting portion of the rim 52 and the gasket 49, so that tightening of the rim 52 against the flange 48 will press the annulus 53 against the outer side of the gasket 49.

The assembly including the rim 52, the annulus 53, the gasket 49 and the pressure member 50 is held in assembled condition with respect to the cylindrical valve body 32 by means of a clamping block 54, which at the opposite ends thereof is provided with cutouts 55 engaging against the inner side of the pressure member 50. A threaded stud 56 is fixed relative to the block 54 and extends through the center of the spider 51. A holding nut 57 is threaded onto the stud 56 and bears against the outer side of the spider 51.

The inner edge or face of the block 54 is formed with a longitudinally arcuate or convex cam engaging face 58. The gasket 49 with the cylindrical valve body 32 is held normally against the seat formed by the rib 23 by means of a plurality of concentrically arranged springs 59, 60 and 61. The spring 61 is the innermost spring and engages about the nut 57 and about the head 40 of the bolt 39. The spring 60 is an intermediate spring and is disposed between the spring 61 and the outer spring 59. By providing the three concentrically arranged springs 59, 60 and 61, the gasket 49, which is fixed relative to the slidable valve body 32, will be constantly maintained in a seat engaging position, and several springs 59, 60 and 61 may be made of a lighter construction or gauge than would be the case if a single spring were used. Furthermore, the provision of the plurality of concentric springs also eliminates the possibility of the valve body 32 not being held in a closed position, if one of the springs should break.

The valve structure hereinbefore described is selectively moved to an open position by means of a cam 62. The cam 62 is rotatably mounted within the central chamber 19a and is fixed onto a square stud 63 which is formed on the inner end of a cam shaft 64. The cam 62 is held on the stud 63 by means of a cotter pin 65, and preferably a washer 66 is interposed between the cotter pin 65 and the adjacent side of the cam 62. The shaft 64 is also provided with a reduced stud 67 which is rotatably mounted in an axially disposed opening 68 formed in a bearing member 69. The bearing support or member 69 is formed integral with the plate 13 and extends inwardly therefrom and coaxial with the shaft 64. The shaft 64 is journalled through an opening 70 formed in the end wall 11, and has mounted on the outer end thereof a yoke 71 with which an operating handle or the like may be engaged, so as to provide for the selective rotation of the shaft 64.

The shaft 64 is sealed with respect to the wall 11 by means of an annular gasket 72 which engages about the shaft 64 and bears against the inner side of the end wall 11. The gasket 72 is held in a sealed position by means of a cup-shaped gasket compressing member 73 which is slidable on the shaft 64. A spring 74 is disposed loosely about the shaft 64 and bears at one end against the gasket compressing member 73. The other end of the spring 74 bears against an index plate 75 which is disposed about the shaft 64.

The index plate 75 is formed with detents 76 engageable in selected recesses 77 formed in the outer side of a collar 78 which is fixed by means of a fastening device 79 to the shaft 64. The index plate 75 also includes a pair of outwardly extending ears 80, each formed with an opening through which a plate holding pin 81 is adapted to engage. Each pin 81 is mounted within an opening or socket 82 which is formed in the inner side of the end wall 11. The index plate structure is similar to that embodied in my prior Patent No. 2,232,597, issued February 18, 1941.

In Figure 10 there is disclosed diagrammatically a fuel system for a multi-engine airplane wherein a pair of the valves hereinbefore described have been incorporated in the system. The fuel is contained in tanks 83 and 84 which are connected to a balanced valve housing 10 by pipe lines 85 and 86 respectively. Independently operable pumps 87 and 88 are interposed in the pipe lines 85 and 86 respectively, for forcibly withdrawing the fuel from one or more selected tanks and forcing the fuel through the valve housing 10 to a common pipe line 89 connected to the outlet boss 18 of the assembly 10.

A second valve housing 10a is connected to the pipe line 89 and is similar in every detail to the housing 10. However, the housing 10a is reversed from the housing 10, the housing 18a being the intake side, and the housings 16a and 17a being the outlet sides. The housings 16a and 17a are connected to engines (not shown) by pipe lines 89 and 90, respectively.

It will be apparent from the foregoing that the valve assembly herein shown may have the direction of flow of the fluid therethrough reversed without change in the details of construction, this being accomplished by the balancing of pressures within the assembly.

In the older type aircraft fuel systems, a suction pump, located at or near the engine and driven by the engine, was the only means for furnishing a fuel supply to the engine. However, in the newer type aircraft, use is made of booster pumps, one of which is usually located directly beneath each tank. These booster pumps operate independently of the main power plant, and are usually driven by an integral electric motor.

The booster pumps may develop a pressure of 15 to 30 p. s. i. (pounds per square inch), so all the component parts of the entire fuel system must be designed to withstand the booster pump pressure.

It is, of course, well known that the forces imposed upon a conventional poppet type valve have no balancing mechanism. If we assume that the gasoline line pressure is to be 30 p. s. i., the spring holding the poppet valve on its seat must have a load of approximately $$1.5 \text{ in.} \times 1.5 \text{ in.} \times \frac{3.1416}{4} \times 30 = 53 \text{ lbs.}$$

in the seated position. Then, if it were necessary to raise the particular valve plunger against the presure of 30 p. s. i., the total force which the cam must overcome is $$2 \times 53 = 106 \text{ lbs.}$$

In comparison, since the valve embodied in this invention is balanced, the load imposed upon the valve body 32 by the spring need only be sufficient to overcome the friction of the annular sealing member 45.

If it is assumed that a spring load of 10 lbs. is sufficient to overcome the friction of sealing member 45, and, assuming a pressure of 30 p. s. i. in chamber 26 with zero gage pressure in chamber 32a, the resultant force which the cam must overcome is only 10 lbs. due to the spring loading, and say 10 lbs. due to friction of the sealing member 45.

It can readily be seen that the comparison between the force of 106 lbs. obtained with a conventional poppet valve, and 20 lbs. obtained with the balanced type valve, offers appreciable advantages both from the size and weight standpoint and in the torque required at the cam shaft to operate the valve plungers.

To sum up the foregoing information, the fuel pressure loads in a conventional unbalanced type poppet valve are all taken by the poppet itself, which must be moved against the pressure when the valve is operated, while in the balanced type valve embodied in this invention, the fuel pressure loads are balanced and the force required to unseat the valve is reduced to a minimum.

In the use and operation of this valve structure, the two valve housings 16 and 17 are adapted to be connected by suitable pipe connections to independent fluid tanks or pumps, and the outlet boss 18 is adapted to be connected to a pump or a tank. The springs 59, 60 and 61 will normally hold or urge the gasket 49 with the cylindrical valve body 32 to a seat engaging position.

If there is any back pressure from the suction pump, the back pressure from the chamber 32a will not be any greater than the pressure of the fluid in the chamber 19a so that this back pressure will not tend to unseat the valve body 32.

When it is desired to open a selected one of the valve members, the shaft 64 is rotated to the desired degree, so that the cam 62 will engage the clamping block 54 of the selected valve. The cam 62 is provided with a sufficiently long cam block engaging face, so that in one position thereof the cam member 62 will maintain both valve assemblies 19 and 20 in open position as diagrammatically shown in Figure 8.

If only one of the valve assemblies is to be moved to an open position, as for instance, the valve assembly 20, the cam member 62 is rotated to the position shown in Figure 4. This position is also shown diagrammatically in Figure 9. If it is desired to move the valve assembly 19 to an open position, which is the position shown diagrammatically in Figure 7, the cam member 62 is rotated to a position for engagement with the clamping block 54 forming part of the assembly 19. In the event both valve assemblies are to be in a closed position, which is the position shown in Figure 6, the cam member 62 is rotated to a position where it will be out of engagement with both clamping blocks 54 of the two assemblies 19 and 20. The cam member 62 is held in a selected valve assembly engaging position or in an off or closed position by means of the index plate 75 and the recessed collar 78, the latter being fixed on the shaft 64.

The valve structure hereinbefore described has been designed particularly for use in an airplane where the fuel is to be taken from several supply tanks or where the oil for the engine is to be taken from one or more supply tanks. With the structure hereinbefore described, the valve assemblies 19 and 20 may be completely assembled exteriorly of the valve housing structure and inserted in the several valve housings through the outer ends thereof. The valve assemblies are held in the housings, therefore, by means of the coupling members 29 which bear against the spring fingers 28 carried by the assembly heads 27. It will be apparent from the foregoing that these valve assemblies can be manufactured on a production basis exteriorly of the valve housing structure and can be readily removed for replacement of any worn gasket or other damaged part.

What I claim is:

1. In combination a valve housing, a seat at one end of said housing, a coupling element at the other end of said housing, and a valve assembly in said housing, said assembly comprising an outer cylindrical cage member having an open inner end engageable about said seat and also having a closed outer end, said cage member having intake openings therethrough adjacent said seat, a plurality of yieldable fingers carried by the outer end of said cage member engaging against said element to hold said cage member about said seat, a spring-pressed valve member slidable in said cage member, means slidably sealing said valve member in said cage member, said valve member opening inwardly of said housing whereby fluid pressure in said housing will provide a counterbalancing means on opposite sides of said valve member.

2. A valve assembly for a valve housing having a valve seat, comprising an outer cylindrical cage open at its inner end and closed at its outer end, a plurality of outwardly extending resilient retaining fingers carried by the outer end of said cage, said cage having openings therethrough adjacent the inner end thereof, a cylindrical valve member slidable in said cage, an inwardly extending flange carried by the inner end of said valve member, means detachably securing a valve gasket on said flange, a plurality of concentric springs normally urging said valve member to seat engaging position, and means sealing said valve member in said cage.

3. A valve assembly for a valve housing having a valve seat, comprising an outer cylindrical cage open at its inner end and closed at its outer end, a plurality of outwardly extending spring fingers carried by the outer end of said cage for engagement with said housing to thereby retain the inner end of the cage about said seat, an inwardly flanged valve member slidable in said cage, means securing a gasket on the flange of said valve member, said cage having slots therein adjacent the outer end thereof, outwardly directed lugs carried by said valve member slidable in said slots, a cup-shaped member disposed within said cage, an outwardly directed flange carried by said cup-shaped member slidably engaging said valve member, means securing said cup-shaped member to said cage, an annular sealing element on said outwardly directed flange and between the periphery of said cup-shaped member and the inner side of said valve member, yieldable pressure means for said sealing element, and spring means normally urging said valve member to seat engaging position.

4. A balanced valve structure comprising in combination, an outer housing, a valve seat carried by said housing adjacent one end thereof, a coupling member at the other end of said housing, and a valve assembly within said housing, said assembly including an outer cup-shaped cage engaging at its inner end about said seat, spring-fingers carried by the outer end of said cage engageable with said coupling member to retain said cage about said seat, said cage having opposed fluid ports adjacent the inner end thereof and having opposed slots adjacent the outer end thereof, a cylindrical port closing valve member slidable within said cage, an inwardly projecting flange at the inner end of said valve member, means securing a gasket on the inner face of said flange, said means including a spider shaped member engaging on the outer side of said flange, sealing means fixed relative to said cage and engaging within said valve member, outwardly projecting lugs carried by the outer end of said valve member slidably engaging in said slots to hold said valve member against rotary movement, and a plurality of concentric springs interiorly of said sealing means and bearing against said spider shaped member to normally urge said valve member to seat engaging position.

5. In a valve assembly, a cylindrical cage provided with intake ports at its inner end and formed with a closed outer end, said cage also having opposed slots adjacent the outer end thereof, a cylindrical valve member slidable in said cage and adapted when in an innermost position to close said ports, lugs carried by said valve member slidable in said slots to hold said valve member against rotary movement, a gasket, means securing said gasket on the inner end of said valve member, means constantly urging said valve member inwardly, a cup-shaped body fixed within said cage, a flange carried by said body slidably engaging the inner surface of said valve member, an annular compressible sealing element seated on said flange and bearing against the inner surface of said valve member and the periphery of said body, a compression ring bearing against the outer side of said element, and yieldable means holding said element under compression.

6. A valve assembly for a valve housing having a valve seat, comprising an outer cylindrical cage open at its inner end and closed at its outer end, a plurality of outwardly extending resilient retaining fingers carried by the outer end of said cage, said cage having openings therethrough adjacent the inner end thereof, a cylindrical valve member slidable in said cage, an inwardly extending flange carried by the inner end of said valve member, means detachably securing a valve gasket on said flange, spring means urging said valve member to seat engaging position, and means sealing said valve member in said cage.

7. A valve assembly for a valve housing having a valve seat, comprising an outer cylindrical cage open at its inner end and closed at its outer end, resilient means holding said cage with the inner end about said seat, said cage having openings therethrough adjacent the inner end thereof, a cylindrical valve member slidable in said cage, an inwardly extending flange carried by the inner end of said valve member, means detachably securing a valve gasket on said flange, spring means urging said valve member to seat engaging position, and means sealing said valve member in said cage.

8. In a valve assembly, a cylindrical cage provided with intake ports at its inner end and formed with a closed outer end, said cage also having opposed slots adjacent the outer end thereof, a cylindrical valve member slidable in said cage and adapted when in an innermost position to close said ports, lugs carried by said valve member slidable in said slots to hold said valve member against rotary movement, a gasket, means securing said gasket on the inner end of said valve member, means constantly urging said valve member inwardly, a cup-shaped body fixed within said cage, a flange carried by said body slidably engaging the inner surface of said valve member, an annular compressible sealing element seated on said flange and bearing against the inner surface of said valve member and the periphery of said body, and means holding said sealing element under compression.

GEORGE T. DOWNEY.